United States Patent Office 2,870,158
Patented Jan. 20, 1959

2,870,158
PROCESS FOR THE PREPARATION OF THIAZOLES

Friedrich Asinger and Max Thiel, Leuna, Lothar Schröder, Halle, and Gerhard Reckling, Spergau, Germany, assignors to VEB Leuna-Werke "Walter Ulbricht," Leuna, Germany No Drawing. Application October 10, 1957
Serial No. 689,266

Claims priority, application Germany December 29, 1956

9 Claims. (Cl. 260—302)

The present invention relates to a process for the preparation of thiazoles and, more particularly, to the preparation of thiazoles of formula (1) 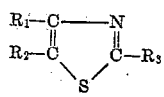

wherein $R_1$, $R_2$, $R_3$ may be hydrogen, alkyl, aryl, aralkyl or cycloalkyl radical and $R_1$ and $R_2$ may be divalent radicals, e. g., aliphatic hydrocarbon radicals whose free bonds are joined together to form a cyclic structure.

It is known that the thiazoles may be prepared by the condensation of α-haloketones or α-haloaldehydes with thioamides. These processes, however, are cumbersome and uneconomical, and do not readily lend themselves to large scale production. It has now been found that the thiazoles can be obtained in a simple manner and in good yield by the dehydrogenation of a thiazoline, e. g., Δ-3,4 thiazolines or Δ-2,3, thiazolines. The Δ-3,4 thiazolines have been made readily available by a recent process. The Δ-2,3 thiazolines have also been prepared by prior art processes.

The present dehydrogenation process may be illustrated by the following equations:

(2) 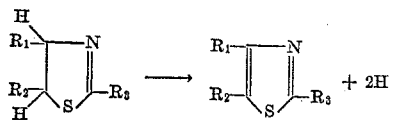

Δ-2,3-thiazoline (3) 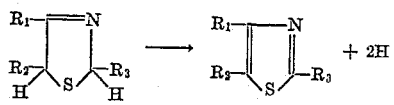

Δ-3,4-thiazoline wherein $R_1$, $R_2$, $R_3$ have the same meaning given to them above in connection with Formula 1. It will be seen that a necessary characteristic of the thiazoline employed is that at least one of the singly bonded carbon atoms carry at least one hydrogen atom. $R_1$, $R_2$, $R_3$, above may also carry functional groups provided that these functional groups are not altered by the dehydrogenation agent employed in the process.

In one aspect of the present invention $R_1$, $R_2$ or $R_3$ of the above formulas are hydrocarbon radicals or hydrogen. Thus $R_1$, $R_2$ and $R_3$ may be an alkyl radical such as methyl, ethyl, n-propyl, isopropyl, n-butyl, tert. butyl, pentyl, hexyl, 2-ethyl hexyl, heptyl, octyl, nonyl, decyl, hendecyl, dodecyl, tridecyl, hexadecyl, etc. $R_1$, $R_2$ or $R_3$ in the above formulas may also be an aryl hydrocarbon radical and preferably one having up to 3 rings in the aryl nucleus. Thus, $R_1$, $R_2$, or $R_3$ may also be phenyl, naphthyl, anthracyl, tolyl, xylyl, cymenyl, mesitylenyl, biphenylyl, p-n-butyl-phenyl, p-isobutylphenyl, o-n-amylphenyl, 2-methyl-naphthyl-1, 2-ethyl-naphthyl-1, 9-methyl-anthracyl-1, 9-methyl fluoryl-1, phenanthracyl, 2-propylnaphthyl-1, 2-ethyl-p-biphenylyl, etc. $R_1$, $R_2$ or $R_3$ may also be an aralkyl radical such as benzyl, βphenylethyl, γphenylpropyl, p-methylbenzyl, o-methylbenzyl, p-propylbenzyl, αnaphthyl methyl, β(1 naphthyl) ethyl, 1-anthrocylmethyl β(1-anthracyl) ethyl, etc. $R_1$, $R_2$ or $R_3$ may also be a cycloalkyl radical, such as cyclobutyl, cyclopentyl, cyclohexyl, methylcyclopentyl, methylcyclohexyl, bicyclopentylyl, bicyclohexylyl; 2,4,6 trimethyl cyclohexyl, etc.

In accordance with the present invention, the dehydrogenation of the above-mentioned thiazolines may be effected by practically all of the known oxidizing agents. Of particular interest are the inorganic oxidizing agents, such as the chromates (potassium or sodium chromates or bichromates), permanganates (e. g., potassium permanganate), ferris ($Fe^{+++}$) salts (e. g., ferric chlorides) cupric ($Cu^{+++}$) salts (e. g., cupric sulfate). Particularly good yields are obtained with powdered sulfur. Generally, the mild oxidizing agents, e. g., potassium ferricyanide, are most suitable for the present purposes.

The present dehydrogenation process is advantageously carried out in a weakly acid medium. The operating procedure will vary with the particular oxidizing agent and/or the thiazoline. Thus, for example, if sulfur is employed, no solvent is necessary. In other cases the reaction is carried out in an alcoholic or aqueous medium. The particular temperature employed will also vary with the particular thiazoline used or oxidizing agent selected. In general, however, the reaction may be carried out at a temperature within the range of 50°–125° C., and particularly, in the range of 60°–115° C.

The following examples are further illustrative of the present invention, and it will be understood that the invention is not limited thereto:

Example 1

87 g. of thiazoline-Δ-3,4 was mixed with 32 g. of powdered sulfur and heated to a temperature of 100 to 115° C. A vigorous evolution of $H_2S$ set in. After the completion of the evolution of $H_2S$, the reaction product was subjected to distillation. The thiazole which was obtained distills at 117° C. The yield amounts to 81 g., which corresponds to 95% of the theoretical yield. The picrate has a melting point between 159° and 160° C.

Example 2

To 129 g. of 5-methyl-4-ethyl-thiazoline-Δ-3,4 suspended in a weak aqueous solution of sulfuric acid, was added, dropwise, a concentrated solution containing 319 g. of cupric sulfate. The reaction mixture is heated to 60° to 70° C. After completion of the dehydrogenation, which is indicated by the decolorization of the cupric sulfate, the reaction mixture was made weakly alkaline and extracted with ethyl ether. After the vaporization of the ether, 5-methyl-4-ethyl thiazoline distilled at a temperature from 169° to 170° C. The yield amounts to 91 g., which corresponds to 70% of the theoretical yield. The picrate has a melting point from 127° to 128° C.

Example 3

To 129 g. of 5-methyl-4-ethyl-thiazoline-Δ-3,4 at a temperature of 60° to 70° C. is added, dropwise, a saturated solution of 458 g. of potassium ferricyanide in weak sulfuric acid solution. The reaction mixture, after completion of the dehydrogenation, which is indicated by the fact that only potassium ferrocyanide is present, is made weakly alkaline and then extracted with ethyl ether. After vaporization of the ether, 5-methyl-4-ethyl thiazole distilled at a temperature from 169° to 170° C. The yield amounts to 101.5 g., which corresponds to 80% of the theoretical yield.

Example 4

To 129 g. of 2,4,5-trimethylthiazoline-Δ-3,4 dissolved in 200 cc. of absolute ethanol at a temperature of 60° to 70° C., was added, dropwise, a solution of 325 g. FeCl₃ (anhydrous) in absolute ethanol. After completion of the reaction, the hydrochloric acid product was extracted with ethyl ether. The aqueous mother liquor was subsequently made alkaline and likewise extracted with ethyl ether. This ether extract was washed until it was neutral, and then the ether was evaporated. At the subsequent distillation, the 2,4,5 trimethylthiazole distilled at 57° C./12 mm. Hg. The yield amounts to 108 g., corresponding to 85% of the theoretical yield. The picrate has a melting point of 133° C.

Example 5

101 g. of 2-methyl-thiazoline-Δ-2,3 were mixed with 32 g. of powdered sulfur and heated to 100 to 110° C. After completion of the vigorous evolution of H₂S, the product was subjected to distillation. At 127° to 128° C. 2-methyl-thiazole distilled. It was obtained in a yield of 94 g., corresponding to 95% of the theoretical yield. The picrate has a melting point of 153° C.

Example 6

To 115 g. of 2,4-dimethyl-thiazoline-Δ-2,3 was slowly added 115 cc. of 30% aqueous solution of H₂O₂. The reaction is sustained by the heat of reaction and the temperature is not permitted to rise higher than 60° to 70° C. After heating, the reaction product is extracted with ethyl ether. The ether was distilled and the residue was subjected to distillation. The 2,4-dimethylthiazole distilled at 140° to 151° C. The yield amounts to 84 g., corresponding to 75% of the theoretical yield. The melting point of the picrate amounts to 172° C.

Example 7

To 205 g. of 5-methyl-4-ethyl-2-phenylthiazoline-Δ-3,4 suspended in a small quantity of water at a temperature of 70° to 80° C. was added, dropwise, a saturated solution of 98 g. of potassium bichromate in a weak sulfuric acid solution. After the completion of the dehydrogenation, which is indicated by the fact that the reaction product is entirely green in color because of the formation of the chromium (111) salts, the reaction product is made weakly alkaline and extracted with ethyl ether. After the evaporation of the ether, 5-methyl-4-ethyl-2-phenyl-thiazole distilled at 140° C. The yield amounts to 142 g., corresponding to 70% of the theoretical yield. The picrate has a melting point of 183°–184° C.

While the invention has been described with particular reference to specific embodiments, it is to be understood that it is not limited thereto, but is to be construed broadly and restricted solely by the scope of the appended claims.

What is claimed is:

1. A process according to claim 7 wherein the thiazoline employed has the formula

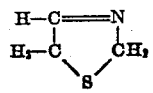

2. A process according to claim 7 wherein the thiazoline employed has the formula

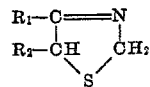

wherein R₁ and R₂ are alkyl radicals.

3. A process according to claim 7 wherein the thiazoline employed has the formula

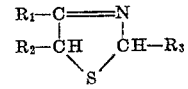

wherein R₁, R₂ and R₃ are alkyl radicals.

4. A process according to claim 7 wherein the thiazoline employed has the formula

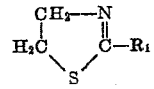

wherein R₁ is alkyl.

5. A process according to claim 7 wherein the thiazoline employed has the formula

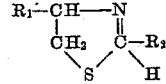

wherein R₁ and R₂ are alkyl radicals.

6. A process according to claim 7 wherein the thiazoline employed has the formula

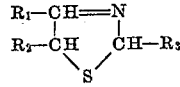

wherein R₁ and R₂ are alkyl radicals and R₃ is a monocyclic aromatic hydrocarbon radical.

7. A process for the preparation of a thiazole which comprises reacting a thiazoline having one double bonded nitrogen to carbon linkage in the ring and at least one singly bonded carbon atom which carries at least one hydrogen atom with an oxidizing agent, selected from the class consisting of alkali metal chromates, alkali metal dichromates, alkali metal permanganates, inorganic cupric salts, inorganic ferric salts, and alkali metal ferricyanides, at a temperature within the range of about 50°–125° C., and in a weakly acid medium until said oxidizing agent is substantially reduced, and recovering said thiazole by distillation.

8. A process for the preparation of a thiazole which comprises reacting a thiazoline having one double bonded nitrogen to carbon linkage in the ring and at least one singly bonded carbon atom which carries at least one hydrogen atom with powdered sulfur at a temperature within the range of about 50°–125° C., until said sulfur is substantially reduced, and recovering said thiazole by distillation.

9. A process for the preparation of a thiazole which comprises reacting a thiazoline having one double bonded nitrogen to carbon linkage in the ring and at least one singly bonded carbon atom which carries at least one hydrogen atom with an aqueous solution of hydrogen peroxide at a temperature below about 70° C. until said peroxide is reduced, and recovering said thiazole by distillation.

No references cited.